United States Patent [19]
Nishida et al.

[11] Patent Number: 5,239,428
[45] Date of Patent: Aug. 24, 1993

[54] MAGNETIC TAPE RECORDING/REPRODUCING APPARATUS AND METHOD

[75] Inventors: Syuzou Nishida; Kousou Hayashi, both of Higashihiroshima, Japan

[73] Assignee: Sharp Kabushiki Kaishi, Japan

[21] Appl. No.: 799,131

[22] Filed: Nov. 27, 1991

[30] Foreign Application Priority Data

Nov. 30, 1990 [JP] Japan ................... 2-340696

[51] Int. Cl.$^5$ ................................ G11B 27/30
[52] U.S. Cl. ...................... 360/72.2; 360/73.08
[58] Field of Search ............. 360/72.2, 72.1, 73.08

[56] References Cited

U.S. PATENT DOCUMENTS

| | | | |
|---|---|---|---|
| 4,985,786 | 1/1991 | Arai et al. | 360/73.08 |
| 5,057,950 | 10/1991 | Ozaki et al. | 360/72.2 |

FOREIGN PATENT DOCUMENTS

| | | | |
|---|---|---|---|
| 0488373 | 6/1992 | European Pat. Off. | 360/72.2 |
| 0003280 | 1/1982 | Japan | 360/72.2 |
| 62-67785 | 3/1987 | Japan . | |
| 1-267870 | 10/1989 | Japan . | |
| 2-149975 | 6/1990 | Japan . | |
| 2-260258 | 10/1990 | Japan . | |
| 3-144949 | 6/1991 | Japan . | |

Primary Examiner—Paul M. Dzierzynski
Assistant Examiner—Richard Hanig
Attorney, Agent, or Firm—Nixon & Vanderhye

[57] ABSTRACT

A magnetic tape recording/reproducing apparatus wherein an area consisting of a predetermined number of successive tracks on a magnetic tape constitutes a unit record area, the unit record area being partitioned into at least two divisional record areas each consisting of successive tracks so that plural systems of data are allocated to the divisional record areas for being separately recorded therein for individual systems, wherein together with first identification data indicative of the order of track arrangement and second identification data for identifying the divisional record area in which the track is included are recorded, as third identification data, first identification data for a track located at the beginning of the divisional record area in which the track is included. According to the arrangement, the third identification data (=first identification data) indicative of the beginning position of the record area to be searched can be recognized in the course of high speed retrieval operation and, therefore, easy access to the beginning position of the record area to be search can be gained in short time through usual reproducing operation.

5 Claims, 6 Drawing Sheets

| ID1 | 1 2 3 ⋯ m | m m m<br>+ + ⋯ +<br>1 2 n | m<br>+<br>n<br>+<br>1 ⋯ | ⋯ | ⋯ | ⋯ |

Fig.1(3) Prior Art

| ID2 | 1 | 2 | 3 | | | |

MAGNETIC TAPE RECORDING/REPRODUCING APPARATUS AND METHOD

BACKGROUND OF THE INVENTION

1. Field of the Invention

Present invention relates to an apparatus for magnetic tape recording/reproducing, such as a digital audio tape recorder (hereinafter referred to as DAT), wherein plural systems of data, for example, video data and audio data, are compositely recorded so that the recorded data can be reproduced separately for individual systems, and to a method for such tape recording/reproducing.

2. Description of the Prior Art

FIG. 1 is an illustration schematically showing general aspect of a recording format in which two systems of data, i.e., video data and audio data, are recorded on a magnetic tape in recording areas partitioned separately for individual systems of data, and the locus of an operation for retrieving desired data from the magnetic tape. FIG. 1 (1) shows the order of arrangement of main data, i.e., video data and audio data on the magnetic tape; FIG. 1 (2) shows the format of first identification data ID1 specifying the order of arrangement of tracks on the magnetic tape, that is, serial numbers of the tracks; FIG. 1 (3) shows the format of second identification data ID2 for identifying record areas for video data and record areas for audio data; FIG. 1 (4) shows the locus of an operation for retrieving the video data on the magnetic tape from the end of tape marker (hereinafter referred to as EOT) and toward the beginning of tape marker (hereinafter referred to as BOT); and FIG. 1 (5) shows the locus of an operation for retrieving same video data from the EOT side toward the BOT side.

In the prior art apparatus, as FIG. 1 (1) shows, video data for one screen image are recorded as one unit of video data in a main data record area having a predetermined m number of successive tracks, and audio data corresponding to the video data for one screen image are recorded in a main data record area having a predetermined n number of successive tracks continued from the first mentioned tracks; and the one unit of video data and the corresponding one unit of audio data constitute one unit of record data.

In sub-code record areas of individual tracks on the magnetic tape are recorded, in terms of serial number, first identification data ID1 according to the order of track arrangement as shown in FIG. 1 (2), and second identification data ID2 according to the order of arrangement of video data and audio data of each unit as shown in FIG. 1 (3). These identification data ID1, ID2 are utilized as an absolute time index in the case of reproducing operation and/or as a so-called "head out (beginning position search)" index in the case of screen retrieval.

When, for example, second record unit of video data on the magnetic tape is to be retrieved from the EOT side toward the BOT side, as FIG. 1 (4) shows, high speed retrieval operation is first carried out toward the record position of the video data to be searched, and when point A or the beginning position of the video data to be searched is passed, the operation is switched over to a reproducing mode operation for retrieval toward the EOT side. Once the beginning position A is passed in this retrieval operation, the retrieval operation returns to the position reached just prior to the passage of the beginning position A and from thence run is made again toward the EOT side for access to the beginning position A.

When same video data are to be retrieved from the BOT side toward the EOT side, as FIG. 1 (5) shows, high speed retrieval operation is first carried out toward the record position of the video data to be searched, and when the record position of audio data located just prior to the video data to be searched, the operation is switched over to a reproducing mode operation for retrieval toward the EOT side. Once the beginning position A is passed in this retrieval operation, the retrieval operation returns to the position reached just prior to the passage of the beginning position A and from thence run is made again toward the EOT side for access to the beginning position A.

Figure 1:
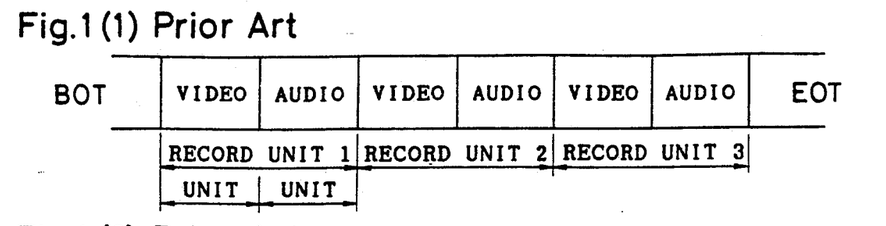
Figure 2:
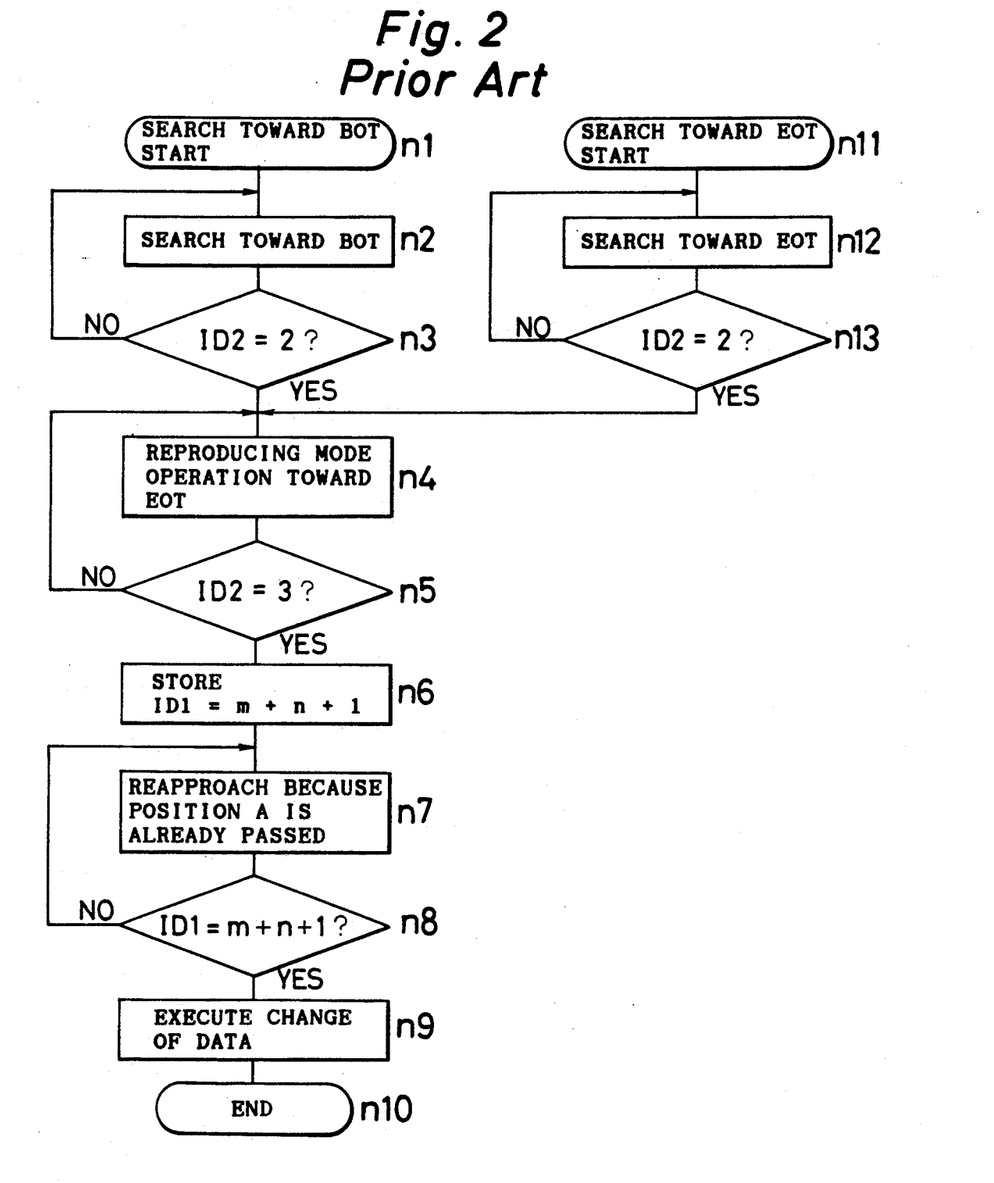
FIG. 2 is a flow chart showing the manner of retrieval operation of the conventional DAT.

FIG. 2 is a flow chart showing the manner of retrieval operation. The retrieval operation is explained in further detail below with reference to the flow chart.

When retrieval is started toward BOT, at step n2 next to starting step n1, high speed retrieving operation toward BOT is carried out. At next step n3, it is determined whether or not the record area whose second identification data ID2 is "2", that is, a record area of audio data just prior to that of the video data to be searched has been reached. Retrieval in same direction is continued thereafter and until that decision has been made. When the record area whose second identification data ID2 is "2" has been reached, operation, proceeds to next step n4. By this point of time, the beginning position A of the target area has been passed. At step n4, therefore, retrieval in reproducing operation mode is made toward EOT.

Then, at step n5, it is determined whether or not the record area whose identification data ID2 is "3" has been reached, that is, whether or not the record area of the target video data has been reached. Retrieval in same direction is continued thereafter and until that decision has been made. After the record area whose second identification data ID2 is "3" has been reached, and at next step n6, the first identification data ID1 which is read when that record area is reached, that is, index number (m+n+1) for the beginning track of the record area of the target video data is stored in place.

By this time, the beginning position A to be searched has been passed. At step n7, therefore, the operation returns to a position reached just prior to the beginning position A being passed, and retrieval in reproducing operation mode is repeated toward EOT. Nextly, at step n8, it is determined whether or not the beginning position A corresponding to the previously stored identification data ID1=m+n+1 has been reached. When this decision has been made, that is, the beginning position A of the video data to be searched has been retrieved, operation proceeds to next step n9 at which, for example, recording of new video data in the record area of the target video data is executed. Upon completion of that operation, the operation proceeds to next step n10 at which all operation is ended.

When retrieval is started toward EOT, at step n12 next to starting step n11, high speed retrieving operation toward EOT is carried out. At next step n13, it is determined whether or not the record area whose second identification data ID2 is "2", that is, a record area of audio data just prior to that of the video data to be searched has been reached. Thereafter and until this decision has been made, retrieving operation in same direction is continued. When the record area whose second identification data ID2 is "2" is reached, operation proceeds to next step n4. Subsequent steps of operation are same as those already explained.

In the above described prior art DAT, when video data or audio data are to be retrieved, in order to locate the beginning position of the data, that is, the number (m+n+1) of identification data ID1 of the beginning position, or boundary number for record units, as in the above described example, it is necessary to carry out a high speed retrieval operation first and then a retrieval operation in reproducing operation mode. Further, when the target beginning position A is thus recognized, the beginning position A has already been passed and, therefore, it is again necessary to carry out operation for access to the target beginning position A. This involves some wastefull movement and considerable loss of time.

SUMMARY OF THE INVENTION

It is an object of the invention to provide a magnetic tape recording/reproducing apparatus and method which enable retrieval operation to be carried out without involving any inefficient aspect of operation and in short time.

According to the invention there is provided a magnetic tape recording/reproducing apparatus wherein an area consisting of a predetermined number of successive tracks on a magnetic tape constitutes a unit record area, the unit record area being partitioned into at least two divisional record areas each consisting of successive tracks so that plural systems of data are allocated to the divisional record areas for being separately recorded therein for individual systems, the apparatus comprising:

first identification data recording means for recording first identification data indicative of the order of track arrangement, in a sub-data record area of each track;

second identification data recording means for recording, in the sub-data record area of each track, second identification data for identifying the divisional area in which the track is included;

third identification data recording means for recording, in the sub-data record area of each track and as third identification data, first identification data corresponding to a track positioned at the beginning of the divisional record area in which the particular track is included; and retrieval means for retrieving at high speed the divisional record area to be retrieved on the basis of the second identification data using a record area located at the beginning side of the magnetic tape as sub-target, reading out a third identification data of the divisional record area to be retrieval or the record area located at the beginning side of the magnetic tape during the high speed retrieval, and retrieving at reproduction speed the beginning position of the divisional record area to be retrieved on the basis of the read-out third identification data after the high speed retrieval.

According to the invention, the reading of the third identification data changes past the beginning position of the record area to be searched during a high speed retrieval operation, and from this third identification data can be known the first identification data indicative of the beginning position of the record area to be searched. Then, in reproducing operation mode, easy access to the beginning position of the record area to be directly searched can be gained and thus retrieval operation can be performed without involving superfluous movement and in short time.

As stated above, according to the invention, as the beginning position of the record area to be searched is passed during high speed retrieval operation, the reading of the third identification data changes and from this third identification data can be recognized the first identification data indicative of the beginning position of the record area to be searched. Therefore, in subsequent reproducing operation, it is possible to gain direct access to the beginning position of the record area to be searched. In this way, retrieval operation can be carried out without loss of efficiency and in short time.

According to the invention, the retrieval means is of such arrangement that when it detects the second identification data indicative of the record area to be searched through high speed retrieval during its retrieval operation toward the beginning of the magnetic tape, it stores therein the third identification data for the record area, and when it detects a record area located at the beginning side of the record area to be searched, its operation is switched over to a retrieval operation in usual reproduction mode, the retrieval operation being ended upon detection of a track corresponding to the stored third identification data.

Further, according to the invention, the retrieval means is of such arrangement that when it detects a record area located at the beginning side of the record area to be searched through high speed retrieval during its retrieval operation toward the end of the magnetic tape, it determines, on the basis of the third identification data for the detected area, third identification data for the record area to be searched and stores same therein, and the mode of its operation is then switched over to a retrieval operation in usual reproduction mode, the retrieval operation being ended upon detection of a track corresponding to the stored third identification data.

According to another aspect of the invention, there is provided a magnetic tape recording method wherein an area consisting of a predetermined number of successive tracks on a magnetic tape constitutes a unit record area, the unit record area being partitioned into at least two divisional record areas each consisting of successive tracks so that plural systems of data are allocated to the divisional record areas for being separately recorded therein for individual systems, characterized in:

that in a sub-data record area of each track are recorded, in conjunction with first identification data indicative of the order of track arrangement and second identification data for identifying the divisional record area in which the track is included, that part of the first identification data which corresponds to a track located at the beginning of the divisional record area in which the track is included, as third identification data.

Further, according to the invention, there is provided a magnetic tape reproducing method wherein an area consisting of a predetermined number of successive tracks constitutes a unit record area, the unit record area being partitioned into at least two divisional record areas for being separately recorded therein for individual systems, and wherein a sub-data record area of each track has recorded therein, together with first identification data indicative of the order of track arrangement and second identification data for identifying the divisional record area in which the track is included, that part of the first identification data which corresponds to a track located at the beginning of the divisional record area in which the track is included, as third identification data, the method comprising the steps of:

retrieving through high speed retrieval operation the record position of the second identification data indicative of the divisional record area to be searched, retrieving at a reproduction rate the beginning position of the divisional record area to be searched on the basis of third identification data recorded in the track at the retrieved position, and switching the retrieval operation to reproducing operation upon the detection of the beginning position.

BRIEF DESCRIPTION OF THE DRAWINGS

Other and further object, features, and advantages of the invention will be more explicit from the following detailed description taken with reference to the drawings wherein:

FIGS. 1(1)-1(5) are an illustration showing a recording format with respect to a series of data on a magnetic tape in conventional DAT, and the locus of a retrieval operation of the DAT;

FIGS. 6(1)-6(6) are an illustration showing a recording format with respect to series of data on the magnetic tape in the DAT, and the locus of a retrieval operation of the DAT.

DETAILED DESCRIPTION OF THE PREFERRED EMBODIMENTS

Now referring to the drawing, preferred embodiments of the invention are described below.

Figure 3:
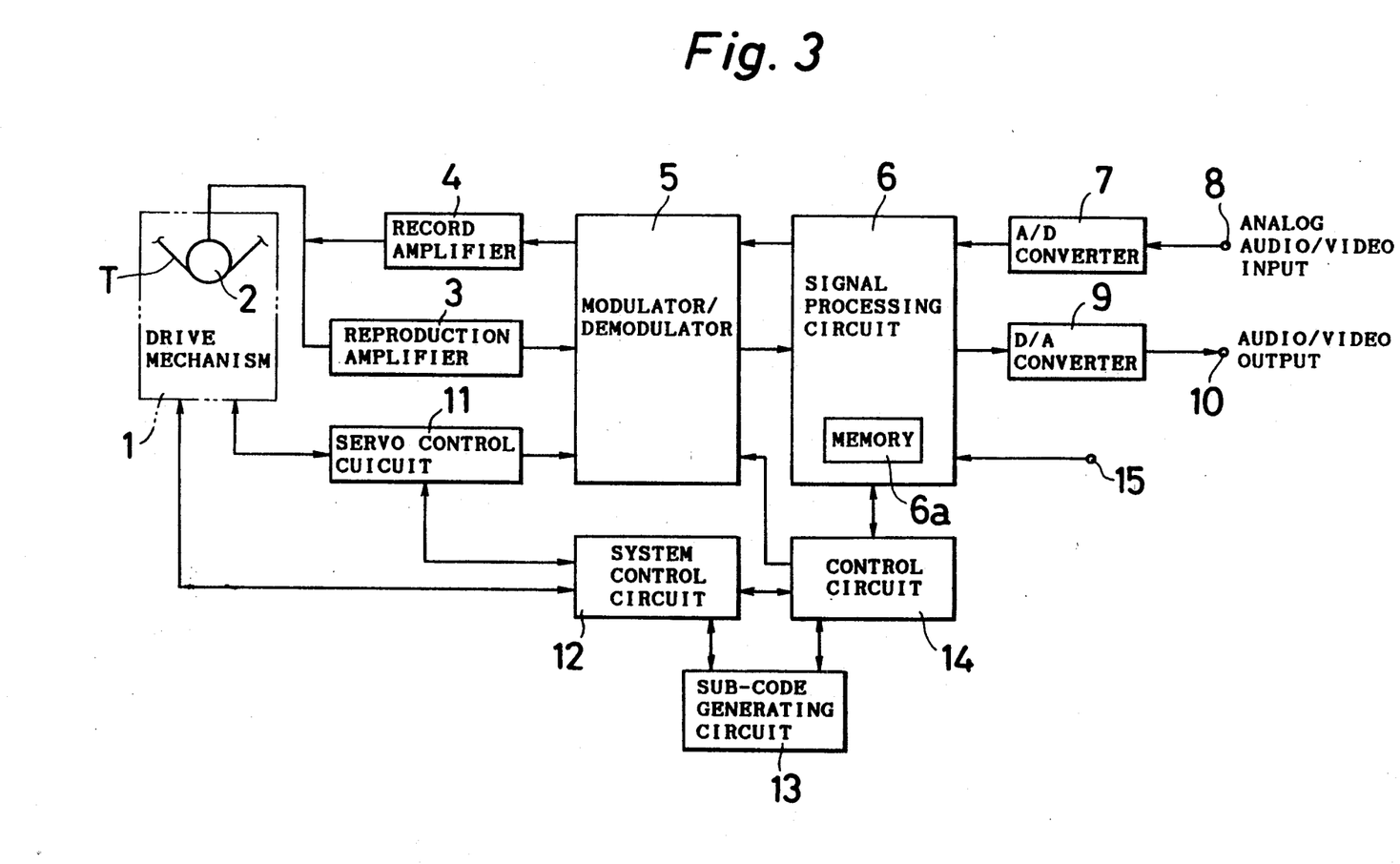
FIG. 3 is a block diagram showing a schematic arrangement of DAT as one embodiment of the invention.

FIG. 3 is a block diagram showing the basic arrangement of a rotary head type DAT representing one embodiment of the invention.

A drive mechanism 1 comprises a capstan not shown which drives a magnetic tape T, and a rotary head 2 which scans across the magnetic tape T in a direction slant a predetermined angle relative to the direction of movement of the magnetic tape T. The rotary head 2 comprises a rotary drum adapted to be driven to rotate while in contact with the magnetic tape T, and a writing magnetic head and a reading magnetic head arranged on the periphery of the rotary drum.

A reproduction amplifier 3 is a circuit operative to amplify a digital signal read from the magnetic tape T by the reading magnetic head of the rotary head 2 and apply same to a modulator/demodulator circuit 5. A record amplifier 4 is a circuit for amplifying a digital signal received from the modulator/demodulator circuit 5 and supplying same to the writing magnetic head of the rotary head 2.

The modulator/demodulator circuit 5 is a circuit for modulating a digital signal received from a signal processing circuit 6 into a signal suitable for being recorded in the magnetic tape T and supplying same to the record amplifier 4, and also for demodulating a reproduced digital signal received from the reproduction amplifier 3 into the original signal in the pre-record state an sending same to the signal processing circuit 6.

The signal processing circuit 6 is a circuit which processes a digital signal received from an analog/digital converter (hereinafter referred to as A/D converter) 7 by interleaving, adding an error correct code, and otherwise, and supplies the processed signal to the modulator/demodulator circuit 5, and which likewise processes a reproduced digital signal received from the modulator/demodulator circuit 5 by deinterleaving and error correction and supplies the processed signal to a next-state digital/analog converter (hereinafter referred to as D/A converter) 9. The signal processing circuit 6 includes a memory 6a for temporary storage of input date.

The A/D converter 7 is a circuit for converting analog audio signals and analog video signals received from an input terminal 8 into digital signals and supplying same to the signal processing circuit 6. The D/A converter 9 is a circuit for converting digital audio signals and digital video signals received from the signal processing circuit 6 into analog audio signals and analog video signals respectively and delivering same to an output terminal 10.

A servo control circuit 11 is a circuit for controlling the rotational speed of the rotary head 2 of the drive mechanism 1 and the travel speed of the magnetic tape T. A system controller 12 has a function to control the operation of the drive mechanism 1 and servo control circuit 11, and also has a function to supply to a control circuit such first identification data ID1 as will be described later.

A sub-code generating circuit 13 has a function to supply to a control circuit 14 such sub-code data as music number, apart from main data such as audio data and video data.

The control circuit 14 is a circuit which controls the entire DAT and comprises, for example, a microcomputer. The control circuit 14 also has a function to generate such second identification data ID2 and third identification data ID3 as will be described later, on the basis of first identification data ID1 received from the system controller 12, and to supply these sub-code data to the signal processing circuit 6.

An input terminal 15 is a terminal for inputting to the signal processing circuit 6 a command for recording/reproducing, as a digital signal.

Figure 4:
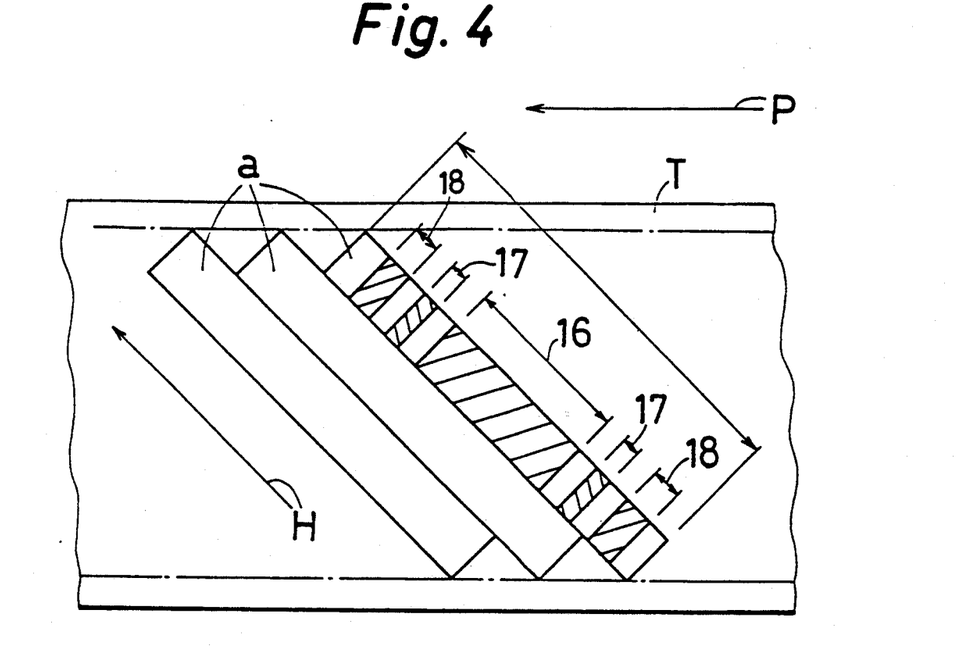
FIG. 4 is a view schematically showing the arrangement of data recorded on a magnetic tape in the DAT.

FIG. 4 is a view schematically showing the arrangement of data recorded in track a on the magnetic tape T in DAT. In each track a which is formed by being scanned by the rotary head 2 moving across the magnetic tape T in a direction slant a predetermined angle relative to the direction of movement P of the tape as shown by arrow H are set, at upper and lower ends thereof, ATF record areas 17 for recording auto-tracking signals, and sub-code record areas 18 for recording identification data ID1, ID2, ID3 which serve as indexes for retrieval, separately from main data record area 16 for recording main data such as audio data and video data.

Figure 5:
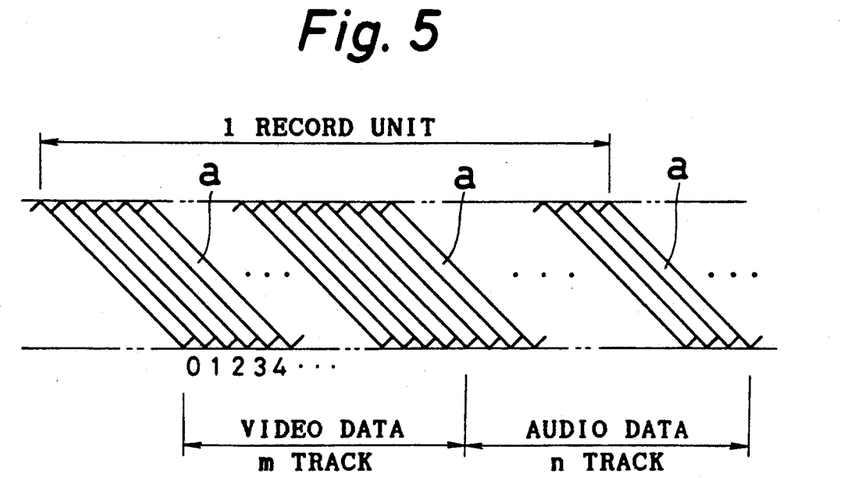
FIG. 5 is a view schematically showing the arrangement of tracks formed on the magnetic tape in the DAT.
Figure 6:
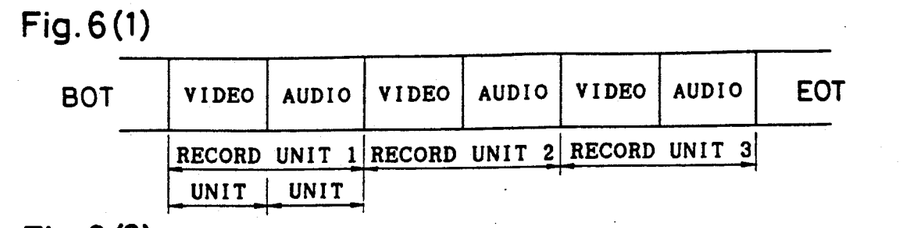

FIG. 5 is a view schematically showing record areas of video data and audio data recorded by DAT on the magnetic tape T. In the example shown, an area for m number of successive tracks is provided as a record area for video data of one screen image and, in continuation thereto, an area for n number of successive tracks is provided as a record area for audio data corresponding to the video data of one screen image. This set of successive tracks (m+n) is set as one record unit.

FIG. 6 is an illustration schematically showing general aspect of a recording format in which two systems of data, i.e., video data and audio data, are recorded by DAT on a magnetic tape T in recording areas partitioned separately for individual systems of data, and the locus of an operation for retrieving desired data from the magnetic tape T. FIG. 6 (1) shows the order of arrangement of main data, i.e., video data and audio data on the magnetic tape T; FIG. 6 (2) shows the format of first identification data ID1 specifying the order of arrangement of tracks on the magnetic tape T, that is, serial numbers of the tracks; FIG. 6 (3) shows the format of second identification data ID2 for identifying record areas for video data and record areas for audio data; FIG. 6 (4) shows the format of third identification data ID3 indicative of the identification number of the track at the beginning position of one unit record area for video data and audio data, that is, the beginning position of the one unit of data; FIG. 6 (5) shows the locus of an operation for retrieving the video data on the magnetic tape T from the end of tape marker (hereinafter referred to as EOT) and toward the beginning of tape marker (hereinafter referred to as BOT); and FIG. 6 (6) shows the locus of an operation for retrieving same video data from the EOT side toward the BOT side.

In this example, as FIG. 6 (1) shows, video data for one screen image are recorded as one unit of video data in a main data record area 16 having a predetermined m number of successive tracks, and audio data corresponding to the video data for one screen image are recorded in a main data record area 16 having a predetermined n number of successive tracks continued from the first mentioned tracks; and the one unit of video data and the corresponding one unit of audio data constitute one unit of record data.

In sub-code record areas 18 of individual tracks on the magnetic tape T are recorded, in terms of serial number, first identification data ID1 according to the order of track arrangement as shown in FIG. 6 (2), and second identification data ID2 according to the order of arrangement of video data and audio data of each unit as shown in FIG. 6 (3), in same way as in the prior art DAT.

In this embodiment, as FIG. 6 (4) shows, third identification data ID3 is added to each sub-code record area. This identification data ID3 is common to the entire record area for one unit of data. For example, to the m number of tracks constituting the record area of a first unit of video data is given, as identification data ID3, index number "1" of first identification data for the beginning track of the record area.

These identification data ID1, ID2, ID3 are utilized as indexes for absolute time in the case of reproducing operation, and/or as indexes for so-called "head out (beginning position search)" in the case of screen retrieval, as is the case with the prior art DAT.

Nextly, the outline of recording and reproducing operations of the above described DAT will be explained.

Recording Operation

Analog audio and analog video signals input from input terminal 8 are converted by A/D converter 7 into digital signals. The audio and video signals converted into digital signals are subjected to processing by signal processing circuit 6, such as interleaving and add-on of error-correcting code. At same time, first identification data ID1 indicative identification data ID2, ID3 are supplied from system controller 12 to control circuit 14, and sub-code information, such as music number, is supplied from sub-code generating circuit 13 to control circuit 14. In turn, control circuit 14 supplies identification data ID1, ID2, ID3 and other sub-code information, such as music number, to signal processing circuit 6.

At signal processing circuit 6, main data, i.e., audio and video signals, and identification data ID1, ID2, ID3 are rearranged according to the format for one track shown in FIG. 4, and signals are sent to modulator/-demodulator circuit 5 accordingly.

Signals modulated at modulator/demodulator circuit 5 are timed for synchronization by action of servo control circuit 11, and are sequentially recorded in succession on magnetic tape T by rotary head 2 via recording amplifier 4 as shown in FIG. 5.

Reproducing Operation

For the purpose of reproduction, operation is carried out in reverse order relative to the above described recording operation. That is, data read by rotary head 2 from magnetic tape T are sent through reproduction amplifier 3 to modulator/demodulator 5, where the data are demodulated, which are in turn sent to signal processing circuit 6.

Signals sent to signal processing circuit 6 are subjected to interleaving at the circuit 6, and only audio signals or video signals are converted by D/A converter 9 into analog signals, which are in turn output from output terminal 10 for being reproduced into sounds or on the screen. Identification data ID1, ID2, ID3 and other sub-code information read from sub-code record area 18 are supplied to control circuit 14 and are used as indexes for leader retrieval or, in the case of a DAT having display capability, as indexes for indication of music number, etc.

In such process of reproduction, one screen image is first reproduced and then corresponding sound is reproduced, and in turn a next screen image is reproduced, followed by reproduction of the sound corresponding to that image. In this way, similar series of operation are repeated. Thus, a so-called presentation system in which narration is given for each frame of picture can be realized. It is understood that the order of video and audio data arrangement described herein should be taken as being only exemplary and not restrictive.

Figure 7:
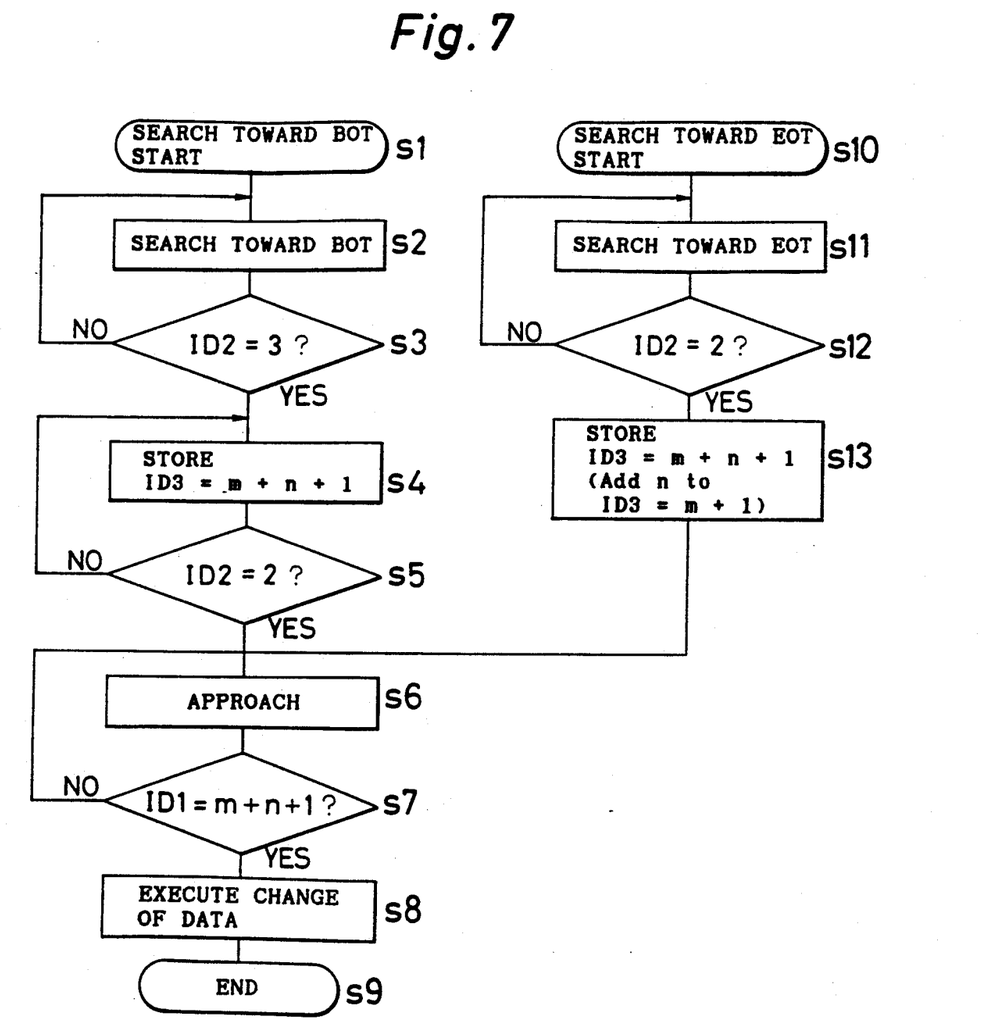
FIG. 7 is a flow chart showing the manner of retrieval operation of the DAT.

FIG. 7 is a flow chart showing the manner of retrieving operation of the DAT. The retrieving operation of the DAT will not be described with reference to the flow chart and FIG. 6 (5) and FIG. 6 (6).

In the case of retrieving operation being started in the direction of BOT, at step s2 next to starting step s1, high speed retrieving operation toward BOT is carried out, and at next step s3, it is determined whether or not a record area where second identification data ID2 is "3" has been reached, that is, whether or not the record area of the video data to be searched has been reached. If not, retrieval is continued in the same direction until a decision to that effect has been made. When the area whose second identification data ID2 is "3" has been reached, then operation proceeds to next step s4. By this time first identification data ID1=m+n+1 corresponding to the beginning position A of one unit of video data which is indicated by second identification data ID2=3 has been recorded as third identification data ID3 in the sub-code area 18 of the track, and therefore the third identification data ID3=m+n+1 is stored in memory 6a of signal processing circuit 6.

Then, at step s5, it is determined whether or not a record area where second identification data ID2 is "2" has been reached, that is, whether or not the beginning position A of the record area of the video data to be searched has been reached. If not, retrieval is continued in the same direction until a decision to that effect has been made. When the area whose second identification data ID2 is "2" has been reached, then operation proceeds to next step s6. By this time the target beginning position a has already been passed, and therefore at step s6 approach to the beginning position A is made through operation toward EOT in reproducing operation mode using the first identification data ID1=m+n+1 as an index.

Then, at step s7, it is determined whether or not a record area whose first identification data ID1=m+n+1 has been reached, that is, whether or not the beginning position A of the record area of the video data to be searched has been reached. If not, approach in same direction is continued until a decision to that effect has been reached. After the area whose first identification data ID1=m+n+1 has been reached, at step s8, operations such as entry of new video data in the record area of the particular video data, and/or reproduction of the video data are carried out. After completion of that operation, at step s9, all processing operation is ended.

In the case of retrieving operation is started toward EOT, at step s11 next to starting step s10, high speed retrieving operation toward EOT is carried out, and at next step s12, it is determined whether or not a record area whose second identification data ID2 is "2" has been reached, that is, whether or not the record area of audio data located just prior to the video data to be searched has been reached. If not, retrieval is continued is same direction until a decision to that effect has been reached. When the area whose second identification data ID2 is "2" has been reached, operation proceeds to next step s13. By this time first identification data ID1=m+n+1 corresponding to the beginning position A of one unit of audio data which is indicated by second identification data ID2=2 has been recorded as third identification data ID3 in the sub-code record area 18 of the track, and therefore that data plus n, namely, third identification data ID3=m+n+1 is stored in memory 6a of the signal processing circuit 6. Then, operation proceeds to step s6 and from thence operation is carried out in same way as earlier described.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which comes within the meaning and the range of equivalence of the claims are therefore intended to be embraced therein.

What is claimed:

1. A magnetic tape recording/reproducing apparatus wherein an area comprised of a predetermined number of successive tracks on a magnetic tape constitutes a unit record area, the unit record area being partitioned into at least two divisional record areas each comprised of successive tracks so that plural systems of data are allocated to the divisional record areas for being separately recorded therein for individual systems, the apparatus comprising:

first identification data recording means for recording first identification data indicative of the order of track arrangement, in a sub-data record area of each track;

second identification data recording means for recording, in the sub-data record area of each track, second identification data for identifying the divisional area in which the track in included;

third identification data recording means for recording, in the sub-data record area of each track and as third identification data, first identification data corresponding to a track positioned at the beginning of the divisional record area in which the particular track is included; and retrieval means for retrieving at high speed the divisional record area to be retrieved on the basis of the second identification data using a record area located at the beginning side of the magnetic tape as a sub-target, reading out the third identification data of the divisional record area to be retrieved or the record area at the beginning side of the magnetic tape during the high speed retrieval, and retrieving at reproduction speed the beginning position of the divisional record area to be retrieved on the basis of the read-out third identification data after the high speed retrieval.

2. A magnetic tape recording/reproducing apparatus as set forth in claim 1, wherein the retrieval means comprises:

means for detecting the second identification data indicative of the record area to be searched through high speed retrieval during its retrieval operation toward the beginning of the magnetic tape, means for storing the third identification data for the record area, and means for switching over to a retrieval operation in a usual reproduction mode when a record area located at the beginning side of the record area to be searched is detected, the retrieval operation being ended upon detection of a track corresponding to the stored third identification data.

3. A magnetic tape recording/reproducing apparatus as set forth in claim 1, wherein the retrieval means comprises:

means for detecting a record area located at the beginning side of the record area to be searched through high speed retrieval during its retrieval operation toward the end of the magnetic tape, means for determining, on the basis of the third identification data for the detected area, third identification data for the recorded area to be searched, means for storing the third identification data for the recorded area to be searched, and means for switching over to a retrieval operation in a usual reproduction mode, the retrieval operation being ended upon detection of a track corresponding to the stored third identification data.

4. A magnetic tape recording method wherein an area comprised of a predetermined number of successive tracks on a magnetic tape comprises a unit record area, the unit record area being partitioned into at least two divisional record areas each comprised of successive tracks so that plural systems of data are allocated to the divisional record areas for being separately recorded therein for individual systems, comprising:

recording, in a sub-data record area of each track, a first identification data indicative of the order of the track arrangement and a second identification data for identifying the divisional record areas in which the track is included, recording, in the sub-data record area of each track, as third identification data, a part of the first identification data which corresponds to a track located at the beginning of the divisional record area in which the track is included.

5. A magnetic tape reproducing method wherein an area comprised of a predetermined number of successive tracks constitutes a unit record area, the unit record area being partitioned into at least two divisional record areas each comprised of successive tracks so that plural systems of data are allocated to the divisional record areas for being separately recorded therein for individual systems, and wherein a sub-data record area of each track has recorded therein, together with first identification data indicative of the order of track arrangement and second identification data for identifying the divisional record area in which the track is included, that part of the first identification data which corresponds to a track located at the beginning of the divisional record area in which the track is included, as third identification data, the method comprising the steps of:

retrieving through high speed retrieval operation the record position of the second identification data indicative of the divisional record area to be searched, retrieving at a reproduction rate the beginning position of the divisional record area to be searched on the basis of third identification data recorded in the track at the retrieved position, and switching the retrieval operation to reproducing operation upon the detection of the beginning position.

* * * * *